United States Patent [19]

Pedicini et al.

[11] Patent Number: 5,721,064
[45] Date of Patent: Feb. 24, 1998

[54] AIR MANAGER SYSTEM FOR REDUCING GAS CONCENTRATIONS IN A METAL-AIR BATTERY

[75] Inventors: Christopher S. Pedicini, Canton; Lawrence A. Tinker, Woodstock, both of Ga.

[73] Assignee: AER Energy Resources Inc., Smyrna, Ga.

[21] Appl. No.: 651,846

[22] Filed: May 21, 1996

Related U.S. Application Data

[63] Continuation-in-part of Ser. No. 447,281, May 22, 1995, Pat. No. 5,560,999, which is a continuation-in-part of Ser. No. 56,440, Apr. 30, 1993, abandoned, and Ser. No. 286,433, Aug. 5, 1994, abandoned.

[51] Int. Cl.[6] .................................................... H01M 12/08
[52] U.S. Cl. .................................. 429/27; 429/13; 429/34
[58] Field of Search ............................ 429/13, 27, 34, 429/35, 72, 82, 83

[56] References Cited

U.S. PATENT DOCUMENTS

| | | |
|---|---|---|
| 737,613 | 9/1903 | Halsey . |
| 1,112,861 | 10/1914 | Snyer . |
| 1,285,659 | 11/1918 | Ford . |
| 1,363,889 | 12/1920 | Linebarger . |
| 2,273,244 | 4/1942 | Ambruster . |
| 2,275,281 | 1/1942 | Berl . |
| 2,468,430 | 1/1949 | Derksen . |
| 2,687,448 | 8/1954 | Gulick et al. . |
| 2,759,038 | 8/1956 | Marsal . |
| 2,907,809 | 10/1959 | Southworth, Jr. et al. . |
| 3,160,528 | 12/1964 | Dengler . |
| 3,288,644 | 11/1966 | Delfino . |
| 3,372,060 | 3/1968 | Platner . |
| 3,382,238 | 5/1968 | Marui . |
| 3,395,047 | 7/1968 | Terry et al. . |
| 3,411,951 | 11/1968 | Gelting . |
| 3,457,115 | 7/1969 | Kent . |
| 3,473,963 | 10/1969 | Sanderson . |
| 3,523,830 | 8/1970 | Baker et al. . |
| 3,553,029 | 1/1971 | Kordesch et al. . |
| 3,576,677 | 4/1971 | Keating, Jr. et al. . |
| 3,607,423 | 9/1971 | Bertioli . |
| 3,615,839 | 10/1971 | Thompson . |
| 3,740,636 | 6/1973 | Hogrefe et al. . |
| 3,871,920 | 3/1975 | Grebier et al. . |
| 3,898,548 | 8/1975 | Peralle et al. . |
| 3,904,441 | 9/1975 | Badger . |
| 3,963,519 | 6/1976 | Louie . |
| 3,994,748 | 11/1976 | Kunz et al. . |
| 4,002,496 | 1/1977 | Nitta et al. . |
| 4,098,964 | 7/1978 | Reber . |
| 4,105,830 | 8/1978 | Kordesch . |

(List continued on next page.)

FOREIGN PATENT DOCUMENTS

| | | |
|---|---|---|
| 0 044 060 | 1/1982 | European Pat. Off. . |
| 0265242 | 1/1988 | European Pat. Off. . |
| 0 293 007 | 11/1988 | European Pat. Off. . |
| 0 341 189 | 11/1989 | European Pat. Off. . |
| 0417324 | 3/1991 | European Pat. Off. . |
| 2353142 | 5/1984 | France . |
| 48-27096 | 5/1988 | Japan . |
| 50-40773 | 5/1988 | Japan . |
| 3239396 | 7/1988 | Japan . |
| 910149629 | 5/1991 | Japan . |
| 59-134570 | 5/1994 | Japan . |
| 1176488 | 12/1966 | United Kingdom . |
| WO94/02966 | 2/1991 | WIPO . |
| PCT/CA93/ 00091 | 3/1992 | WIPO . |
| PCT/US93/ 02354 | 3/1993 | WIPO . |

Primary Examiner—M. Nuzzolillo
Attorney, Agent, or Firm—Jones & Askew

[57] ABSTRACT

A rechargeable metal-air battery having a housing, an air flow path, and at least one metal-air cell positioned within the housing. An air movement device communicates with the housing. The metal-air cell generates oxygen and hydrogen during cell charging. The air movement device creates a pulsating air flow within the air flow path for directing a flow of the generated gases.

39 Claims, 8 Drawing Sheets

U.S. PATENT DOCUMENTS

| | | |
|---|---|---|
| 4,118,544 | 10/1978 | Pryzbyla et al. . |
| 4,177,327 | 12/1979 | Matthews et al. . |
| 4,189,526 | 2/1980 | Cretzmeyer et al. . |
| 4,207,514 | 6/1980 | Klein . |
| 4,221,644 | 9/1980 | La Barre . |
| 4,246,324 | 1/1981 | de Nora et al. . |
| 4,262,062 | 4/1981 | Zatsky . |
| 4,279,970 | 7/1981 | Breault et al. . |
| 4,352,067 | 9/1982 | Ottone . |
| 4,364,805 | 12/1982 | Rogers . |
| 4,369,235 | 1/1983 | Bursell . |
| 4,448,858 | 5/1984 | Graf et al. . |
| 4,490,443 | 12/1984 | Ruch et al. . |
| 4,493,880 | 1/1985 | Lund . |
| 4,521,497 | 6/1985 | Tamminen . |
| 4,588,660 | 5/1986 | Shimizu et al. . |
| 4,588,661 | 5/1986 | Kaufman et al. . |
| 4,620,111 | 10/1986 | McArthur et al. . |
| 4,687,714 | 8/1987 | Oltman et al. . |
| 4,693,946 | 9/1987 | Niksa et al. . |
| 4,729,930 | 3/1988 | Beal et al. . |
| 4,738,905 | 4/1988 | Collins . |
| 4,756,980 | 7/1988 | Niksa et al. . |
| 4,828,939 | 5/1989 | Turley et al. . |
| 4,842,963 | 6/1989 | Ross, Jr. . |
| 4,857,885 | 8/1989 | Umerez . |
| 4,871,627 | 10/1989 | Strong et al. . |
| 4,885,217 | 12/1989 | Hoge . |
| 4,885,218 | 12/1989 | Andou et al. . |
| 4,894,295 | 1/1990 | Cheiky . |
| 4,908,281 | 3/1990 | O'Callaghan . |
| 4,911,993 | 3/1990 | Turley et al. . |
| 4,913,983 | 4/1990 | Cheiky . |
| 4,927,717 | 5/1990 | Turley et al. . |
| 4,950,561 | 8/1990 | Nikasa et al. . |
| 4,957,826 | 9/1990 | Cheiky . |
| 5,069,986 | 12/1991 | Dworkin et al. . |
| 5,093,213 | 3/1992 | O'Callaghan . |
| 5,156,925 | 10/1992 | Lapp . |
| 5,187,746 | 2/1993 | Narisawa . |
| 5,191,274 | 3/1993 | Lloyd . |
| 5,328,777 | 7/1994 | Bentz et al. . |
| 5,354,625 | 10/1994 | Bentz et al. . |
| 5,356,729 | 10/1994 | Pedicini . |
| 5,362,577 | 11/1994 | Pedicini . |
| 5,387,477 | 2/1995 | Cheiky . |
| 5,560,999 | 10/1996 | Pedicini et al. ............................ 429/27 |

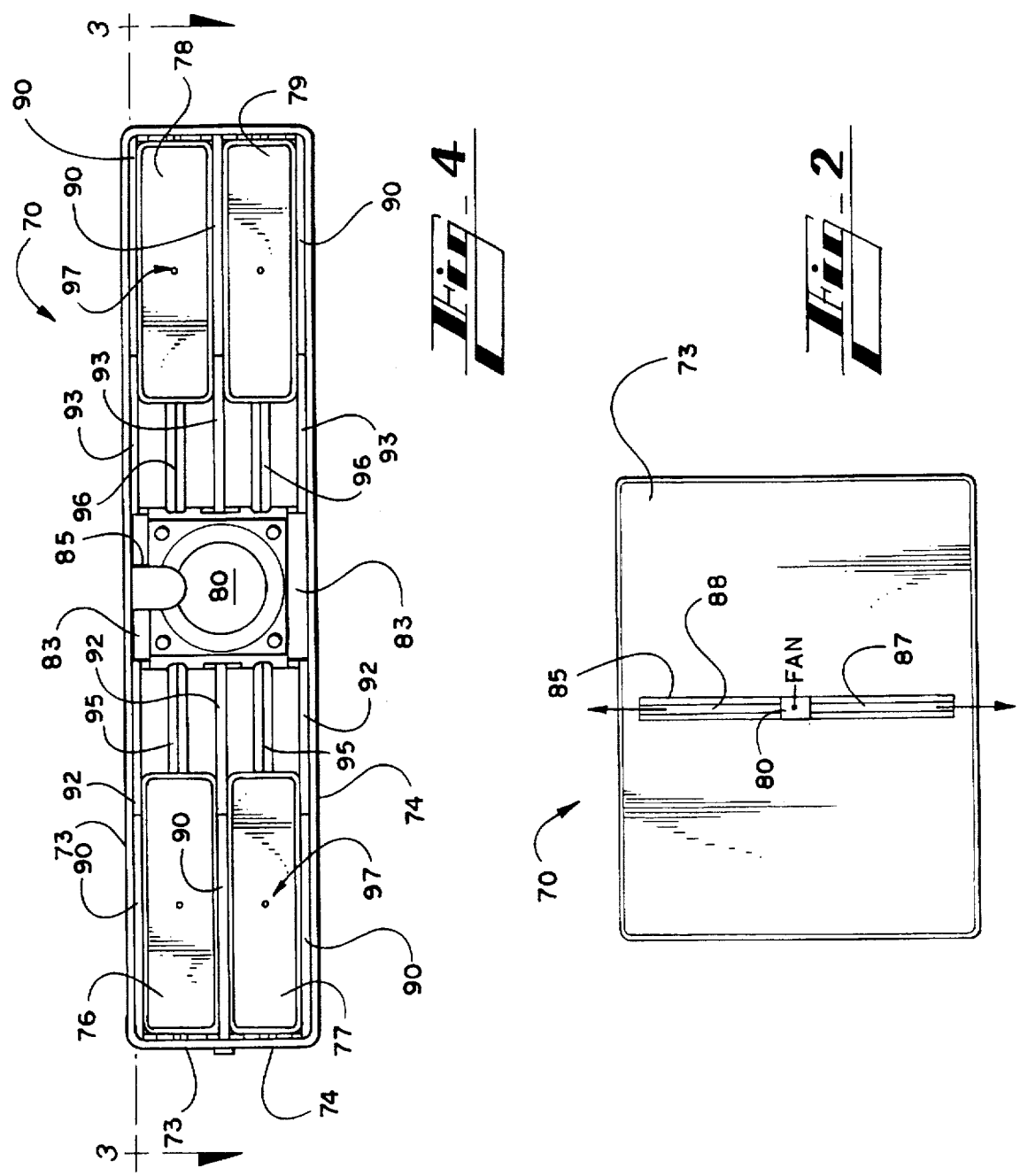

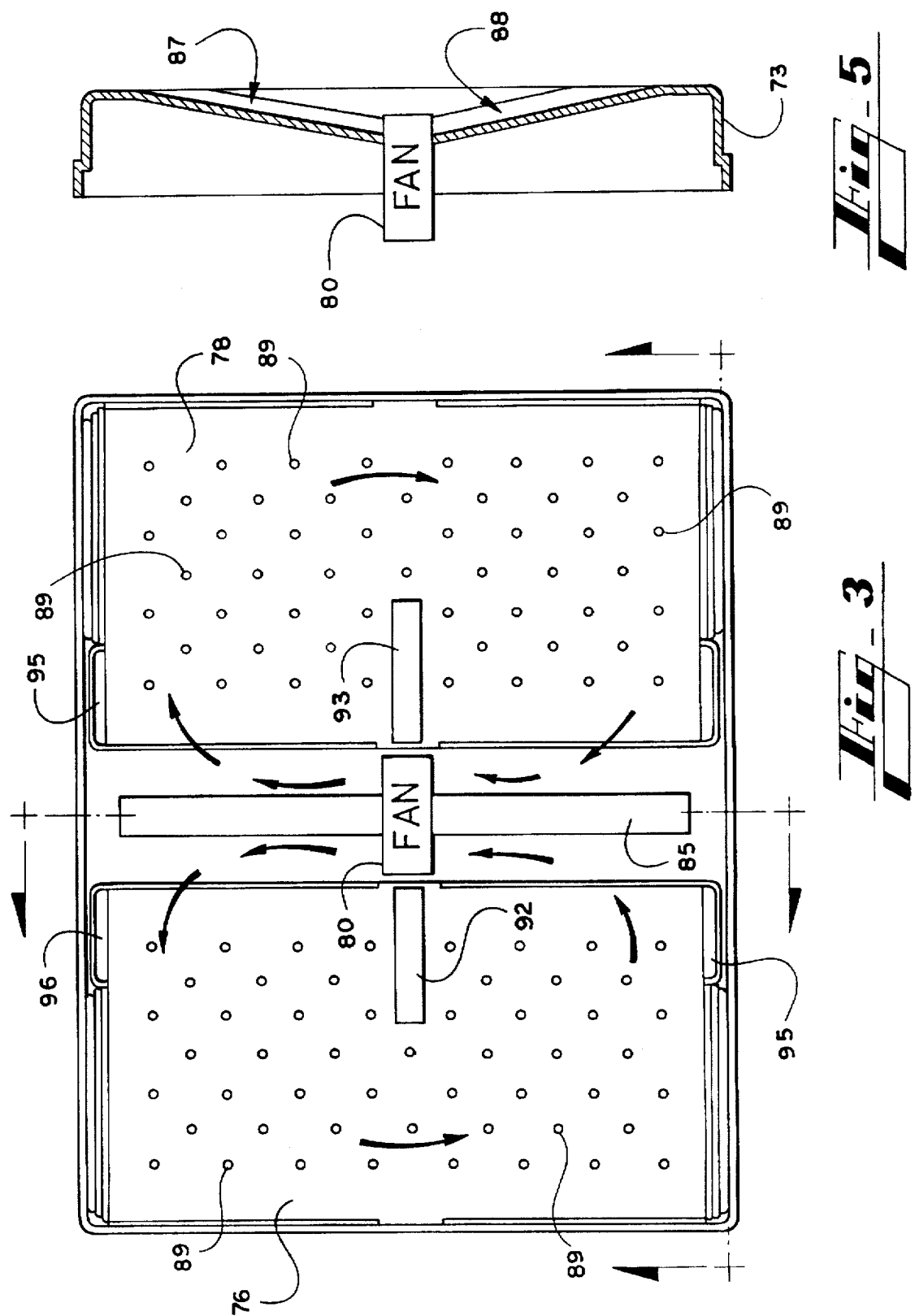

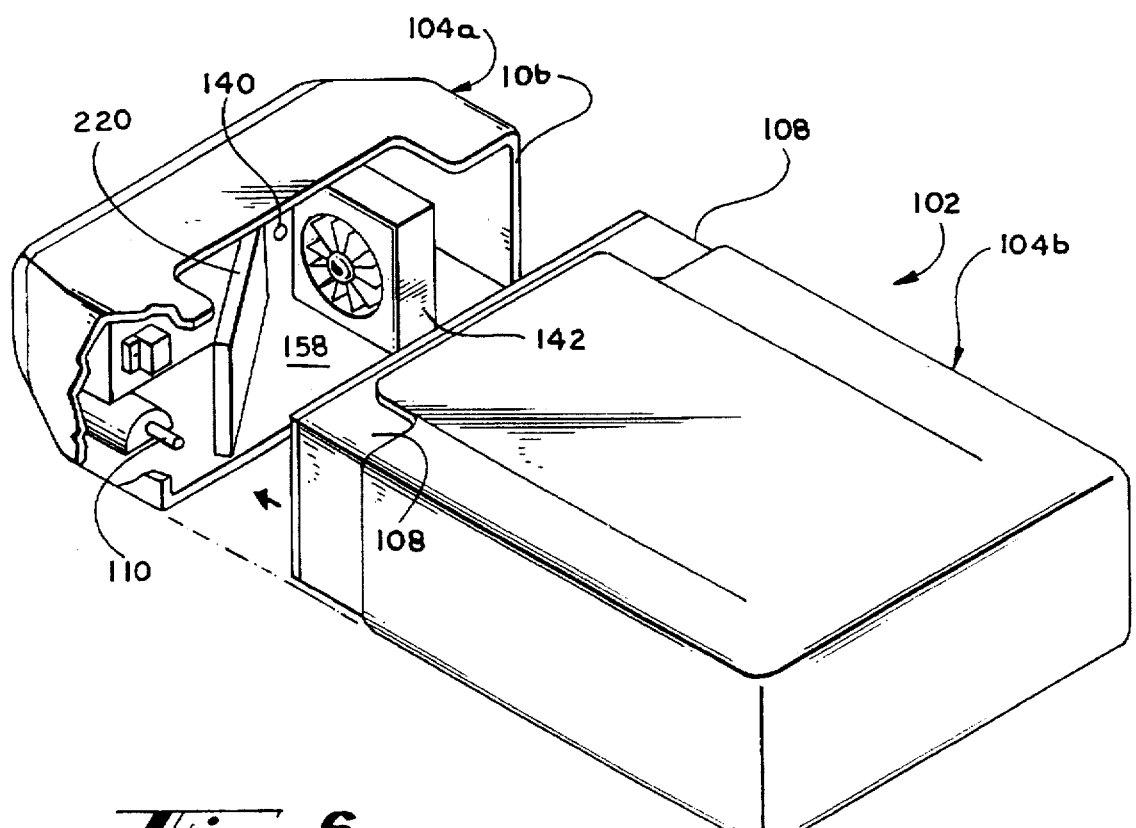
Fig_6
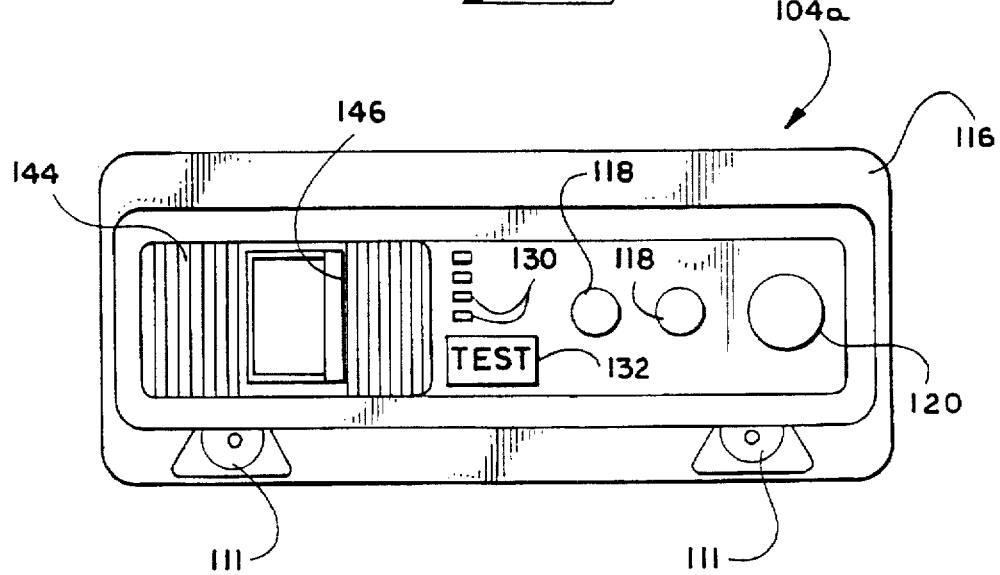
Fig_8

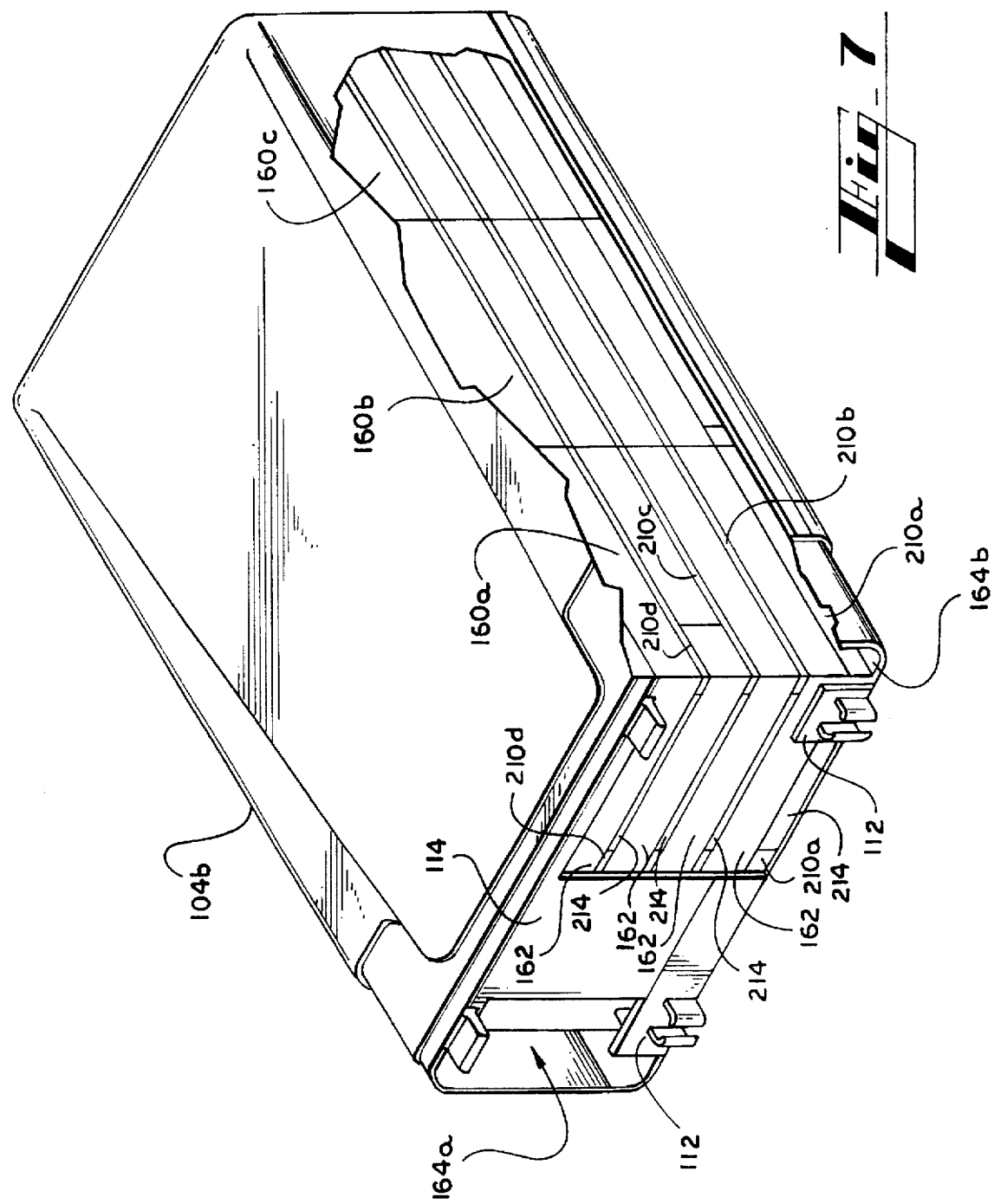

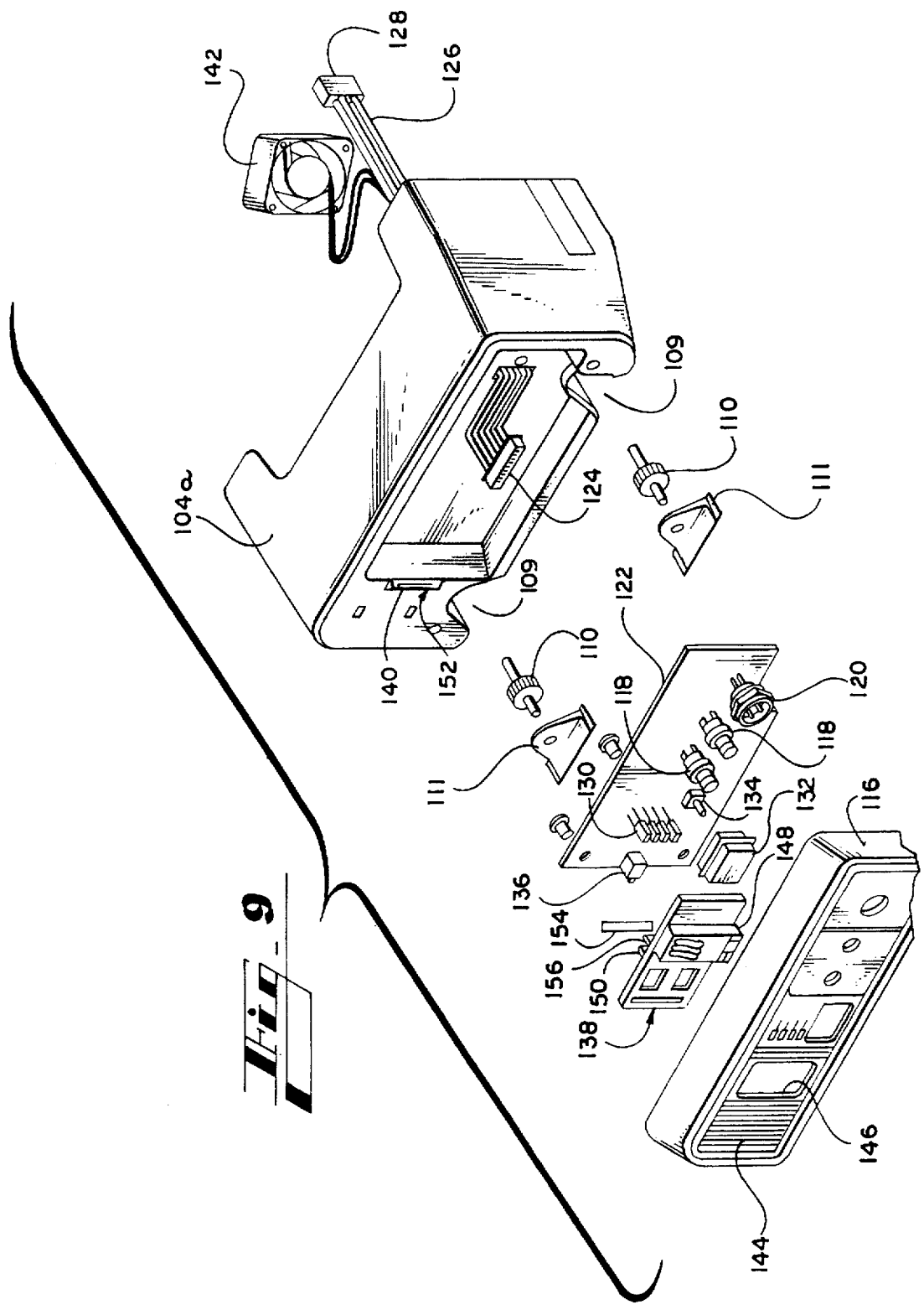

AIR MANAGER SYSTEM FOR REDUCING GAS CONCENTRATIONS IN A METAL-AIR BATTERY

CROSS-REFERENCE TO RELATED APPLICATIONS

This a continuation-in-part of U.S. patent application Ser. No. 08/447,281, filed May 22, 1995, now U.S. Pat. No. 5,560,999, which is a continuation-in-part of U.S. patent applications Ser. No. 08/056,440, filed Apr. 30, 1993, abandoned, and Ser. No. 08/286,433, filed Aug. 5, 1994, also abandoned.

TECHNICAL FIELD

The present invention relates generally to air manager systems for metal-air batteries, and more particularly to an air manager system for reducing gas concentrations in a metal-air battery by use of a fan.

BACKGROUND OF THE INVENTION

Metal-air batteries are comprised of multiple electrochemical cells. Each cell is further comprised of an air permeable cathode and a metallic anode separated by an aqueous electrolyte. Metal-air batteries have a relatively high energy density because they utilize oxygen from ambient air as a reactant in the electrochemical reaction rather than a heavier material, such as a metal oxide or other depolarizable metallic composition. For example, during discharge of a zinc-air battery cell, oxygen from ambient air is converted at the cathode to hydroxide ions, zinc is oxidized at the anode, reacts with the hydroxide ions, and water and electrons are released to provide electrical energy.

Metal-air cells that are rechargeable and thus useful for multiple discharge cycles are called secondary cells. Electrically rechargeable metal-air cells are recharged by applying a voltage between the anodes and cathodes of the cells and reversing the electrochemical reaction. During recharging, the cell anodes are electrolytically reformed by reducing to the base metal the metal oxides formed during discharge. The electrolytic reformation generates a large amount of oxygen and a small amount of hydrogen which are discharged through the air permeable cathodes and through the vents of the cells, respectively.

Because metal-air batteries use oxygen from ambient air as a reactant in the electrochemical reaction, they provide a relatively light weight and compact power supply. Further, because they are rechargeable, metal-air batteries are an ideal source of power for portable equipment, such as portable computers and telephones.

The anodes are made from metals that can be oxidized during discharge in a metal-air cell to produce electrical energy. Such metals include lead, zinc, iron, cadmium, aluminum and magnesium. Zinc is normally preferred because of its availability, energy density, safety, and relatively low cost. A suitable electrolyte is an aqueous electrolyte including Group I metal hydroxides, such as LiOH, NaOH, KOH, CsOH, and the like.

Metal-air battery cells are often arranged in multiple cell battery packs within a common housing to provide a sufficient amount of power output. The housing is necessary to seal-off the cells from excessive ambient air to prevent self-discharge of the cells during periods of non-use, which would result in a decreased battery output and lifetime. Because of the housing, however, it is necessary to provide a supply of oxygen to the cells when they are in use.

Typically, the oxygen is supplied by ambient air, which contains approximately 21% oxygen. The ambient air enters through ventilation holes in the housing that are open during cell use. In the housing, the ambient air is swept across the air cathodes of the cells as reactant air. As the reactant air crosses the air cathodes, the oxygen is depleted by reaction with the cells. After the reactant air has passed across the air cathodes of the cells, it is exhausted outside of the housing. Thus, during cell use, ambient air is drawn into the housing in a continuous flow that is sufficient to achieve the desired power output. Such an arrangement is shown in U.S. Pat. No. 4,913,983 to Cheiky, wherein a fan within the battery housing is used to supply a flow of ambient air to the air cathodes of the metal-air cells.

The recirculation air manager should be able to operate safely in conjunction with rechargeable metal-air batteries. Rechargeable metal-air batteries, as described above, generate oxygen and hydrogen gases during recharging, which can be explosive at a high enough concentrations. If a recirculating air manager were to be used in conjunction with rechargeable metal-air batteries, the bulk of the hydrogen and oxygen gas generated from recharging would stay in the battery housing in close proximity to the cells in high concentrations. If the fan ran continuously to dilute the gas concentrations with make-up air from outside the housing, the battery would tend to dry out and eventually fail. Therefore, there exists a need for a recirculation air manager that can prevent the collection of the gases generated by rechargeable metal-air batteries in an efficient manner.

SUMMARY OF THE INVENTION

The present invention provides a better solution to solving the problems in the art described above by providing an improved air manager system for metal-air batteries. The present invention provides a rechargeable metal-air battery having a housing, an air flow path, and at least one metal-air cell positioned within the housing. An air movement device communicates with the housing. The metal-air cell generates oxygen and hydrogen during cell charging. The air movement device creates a pulsating air flow within the air flow path for directing a flow of the generated gases.

Specific embodiments of the present invention include the use of a fan as the air movement device. The fan may operate during charging, immediately after charging is complete, and thereafter at periodic intervals. The fan pulsates such that the fan need not remain on at all times. The fan preferably pulsates on for a predetermined length of time and then off for the same length of time. The predetermined length of time is from about 10 seconds to about 2 minutes each. The fan also may have at least one pulse at a predetermined interval. The predetermined interval is from about every 10 minutes to about every hour. At each interval, the fan need only pulsate until the concentration of the generated oxygen gas within the air flow path is reduced to near atmospheric levels by mixing the gases within the housing or diluting the gases with ambient air.

The method of the present invention reduces gas concentrations in a metal-air battery. The battery has a plurality of metal-air cells within a housing, an air flow path within the housing, and a fan communicating with the housing. The method includes the steps of: generating oxygen and hydrogen during cell recharging into the air flow path, pulsating the fan to create a pulsating air flow through the air flow path, which thereby reduces the concentration of the gases within the air flow path. The step of pulsating takes place during cell charging, immediately after cell charging is complete, or periodically after cell charging is complete.

The rechargeable metal-air battery itself may be a dual air electrode cell. The housing of the cell may have one or more ventilation passageways. The ventilation passageways may each have a cross sectional area and length selected to eliminate substantially air flow into the housing when the air movement device is turned off. Alternatively, the housing may have a mechanical air door.

Thus, it is an object of the present invention to provide an improved air manager for metal-air batteries.

It is a further object of the present invention to provide an air manager that reduces levels of gases generated during cell charging.

It is a still further object of the present invention to provide an air manager that pulsates to disburse gases generated during cell charging.

It is a still further object of the present invention to provide an air manager that pulsates after cell charging is complete to reduce the concentration of gases within the housing.

It is a still further object of the present invention to provide an air manager system that pulsates at predetermined intervals to reduce the concentration of gases therein.

It Is a still further object of the present invention to provide an air manager system that pulsates for a predetermined length of time to reduce the concentration of gases therein.

It is a still further object of the present invention to provide an air manager system that limits the build up of high concentrations of oxygen and hydrogen generated during cell charging.

It is a still further object of the present invention to provide a method for reducing gas concentrations within a metal-air battery.

Further objects, features and advantages of the present invention will become apparent upon reviewing the following description of preferred embodiments of the invention, when taken in conjunction with the drawings and appended claims.

BRIEF DESCRIPTION OF THE DRAWING

FIG. 2 is a top plan view of the battery of FIG. 1.

FIG. 3 is a top view of the interior of the battery of FIG. 1, taken along line 3—3 of FIG. 4.

FIG. 4 is an end view of the interior of the battery of FIG. 1, taken along line 4—4 of FIG. 3.

FIG. 5 is a side cross sectional view of the cover portion of the housing of the battery of FIG. 1, taken along line 5—5 of FIG. 3.

FIG. 6 is an exploded perspective view of a metal-air battery containing an air manager in accordance with a second embodiment of the present invention.

FIG. 7 is a perspective view from a different angle of the battery housing of the metal-air battery of FIG. 6 with cell stacks that incorporate a first channel embodiment in connection with the air manager of the present invention.

FIG. 8 is a front view of the control panel of the metal-air battery of FIG. 6.

FIG. 9 is an exploded view of the control section housing of the metal-air battery of FIG. 6 showing the control panel receptors and wiring.

DETAILED DESCRIPTION

Figure 1:
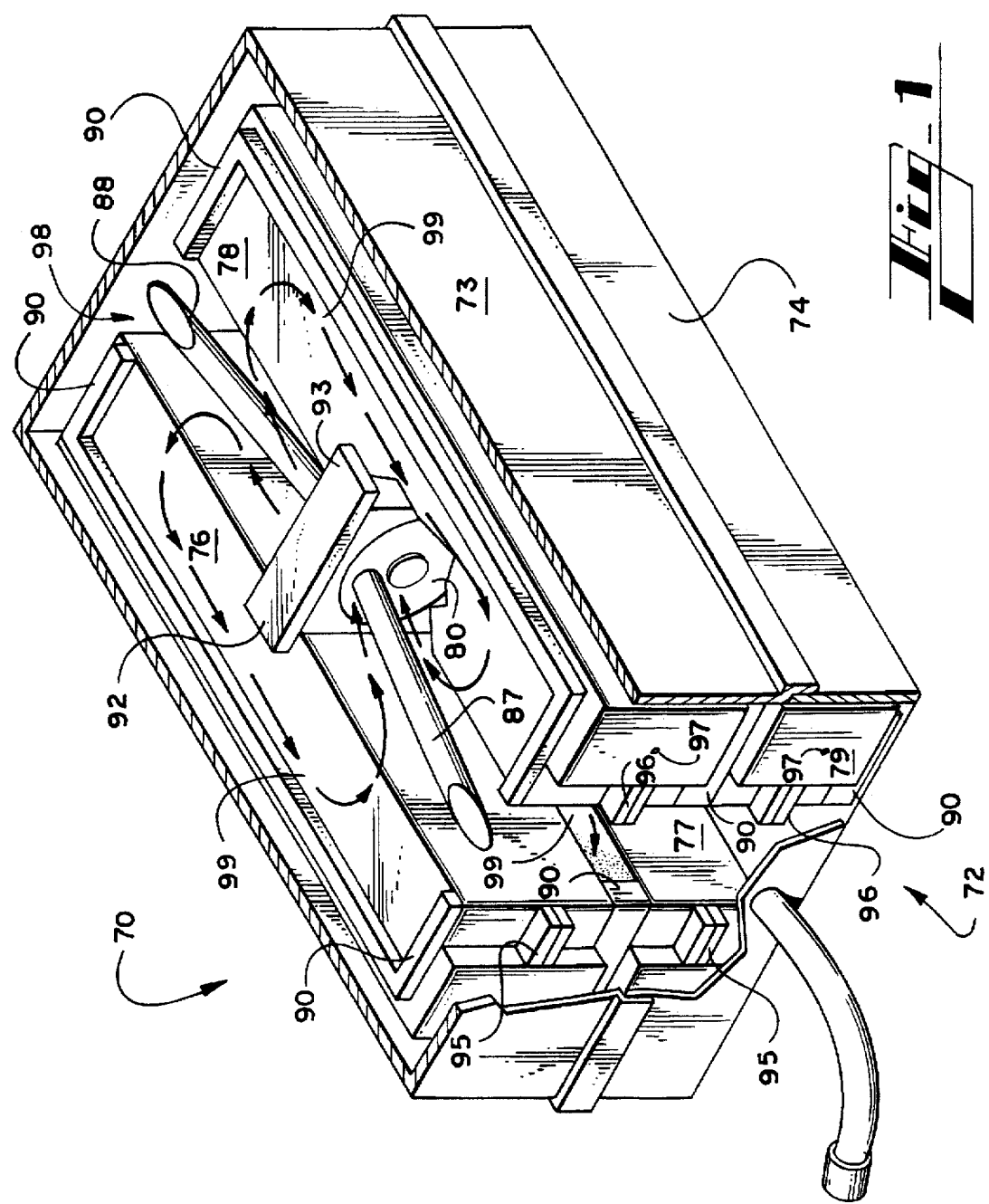
FIG. 1 is a pictorial view of a first embodiment of a battery incorporating the present invention, with portions broken away to show interior detail.

Referring now in more detail to the drawings, in which like numerals refer to like parts throughout the several views, FIGS. 1–5 show a metal-air battery 70 in accordance with the present invention. The battery 70 includes a housing 72 in two parts sealed together at a central joint: a cover portion 73 and a bottom portion 74. Within the housing 72 four cells 76–79 are positioned in two stacks of two cells each. Cells 76 and 77 form a left stack, as viewed in FIG. 4, and cells 78 and 79 form a right stack spaced apart from the left stack. A fan 80 is positioned in the elongate space between the left and right stacks. The fan is oriented to direct air along the space between the stacks, as shown by the arrows in FIG. 3, from a negative pressure side 81 of the fan 80 to a positive pressure side 82. The direction of air flow through the fan is referred to herein as the flow axis of the fan 80. Thus, the left stack, cells 76 and 77, are located on the left side of the flow axis, and the right stack, cells 78 and 79, are located on the opposite side of the flow axis. The fan 80 preferably is located approximately midway along the length of the cells, and the spaces between the fan and the cover 73 and bottom 74 of the housing 72 are filled by gaskets 83.

As best shown in FIGS. 2 and 5, the cover portion 73 of the housing 72 defines a central groove 85 which is deep at the center of the cover 73 and becomes more shallow as the groove approaches the opposite edges of the cover. The groove 85 parallels the flow axis of the fan 80. As shown in FIG. 5, a peripheral portion of the fan 80 protrudes into the groove at the center of the groove. A pair of elongated diffusion tubes 87 and 88 lie in the groove, one on each side of the fan, so that one end of each tube is ported to a position adjacent to the fan, with the tubes aligned with one another on opposite sides of the fan. The tubes extend upwardly along the groove in opposite directions away from the fan, and terminate with their other ends near the main surface of the cover 73.

Thus, the inner ends of the tubes 87, 88 lie next to the fan in the path of fan blades, facing one another through an outer sector of an active area of the fan. The tubes 87, 88 have a cross sectional area and length selected to substantially eliminate air flow into the housing when the fan is turned off. In the embodiment shown in FIGS. 1–5, the tubes each preferably have an inside diameter of about 3/16 inch (3 to 6 mm) and a length of about 7/8 inch (18 to 25 mm). However, any dimensions falling within the ranges and characteristics described above for the ventilation openings 25 may be utilized. Those skilled in the art will appreciate that the length of the passageways formed by the tubes 87, 88 may be increased, and/or the diameter decreased, if the static pressure of the fan is increased. A balance between the static pressure of the fan and the dimensions of the passageways can be found, at which air flow into the housing will be sufficiently reduced when the fan is turned off.

It should also be understood that the passageways provided by the tubes 87, 88 may be provided instead by openings molded into the cover 73, or by enclosing the groove 85.

The cells 76–79 may be dual air electrode cells of the type described in application Ser. No. 08/428,540, filed Apr. 24, 1995, which is incorporated herein by reference. Such cells have air cathodes adjacent to both surfaces of the cell, and zinc anodes between the cathodes. Each cell includes a cathode terminal tab 95 and an anode terminal tab 96, as shown in application Ser. No. 08/428,540 now U.S. Pat. No. 5,569,551, and a hydrogen vent 97 formed in the side of the cell. The cells 76–79 are spaced apart from each other in their stacks and also from the cover 73 and bottom 74 of the housing by a plurality of U-shaped peripheral gaskets 90 that extend around the periphery of the housing except for a central space 98 between the cell stacks, and by channels 99 formed by the gaskets 90, 92 and 93. The left central gaskets 92 extend from the fan over the cell 76, under the cell 77, and between the cells 76 and 77. The right central gaskets 93 extend from the fan over the cell 78, under the cell 79, and between the cells 78 and 79. The gaskets 92 and 93 extend from the fan about three-fifths of the width of the cells. The gaskets 90, 92 and 93 assure that space is provided for air flow adjacent to all the air cathodes of the cells, and also direct air flow in such spaces.

In operation, the fan circulates air along two separate air flow paths, at the same time, as shown by the two circles of arrows in FIGS. 1 and 3. The air pressurized on the positive side of the fan flows from the central space 98 both left and right into the channels 99 between the cells of each stack, and between the cells and the housing. The central gaskets 92, 93 guide the air to the outer edge of the air cathodes, and the peripheral gaskets 90 confine the air to the area of the air cathodes. After passing the central gaskets, the air flows back around to the negative side of the fan for recirculation. New, or make up, air is admitted through the tube 87 on the negative side of the fan, while a similar amount of air is expelled through the tube 88 on the positive side of the fan.

The fan blades mix the incoming air with air within the housing, and force most of the incoming air into the recirculating air flow paths. Although the fan preferably is midway along the length of the cells, it may be positioned at any point along the space between the stacks from which the separate air flow paths may be maintained at the same time. While the fan is turned on, a flow of air occurs in the tubes 87, 88; but when the fan is turned off, the flow in the tubes is so small it does not result in significant discharge of the cells. As a result of the separate air flow paths, all cells of both stacks of cells receive air quickly, and the air received is of more uniform oxygen concentration because the air paths are shorter than in known configurations utilizing the same number of cells. In other words, when the air flow reaches the last air electrode area prior to returning to the fan, the air has traversed a smaller cumulative air electrode area, and therefore is not as depleted of oxygen as was the case in prior systems.

During the recharging of the battery 70, hydrogen and oxygen gases are generated by the metal-air cells 76–79. Hydrogen gas is released through the hydrogen vents 97 on the sides of the cells while the oxygen gas is released through the ventilation openings 89 on the top of the cells. The generated hydrogen gas enters the central space 98 by the hydrogen vents 97 and the generated oxygen gas enters the central space 98 from the channels 99. Thus, the two gases may be in close proximity. Due to the explosive properties of hydrogen gas in the presence of oxygen gas, such as could exist during or after charging, the fan 80 is operated to remove the generated gases from the central space 98 and the channels 99.

In one embodiment, the fan 80 is pulsed on and then off for the same amount of time to create a pulsating air flow through the central space 98 and the channels 99 during charging. By pulsing the fan 80, a sufficient air flow is created to remove or at least dilute the gases from the central space 98 and the channels 99. Continually running the fan 80, however, can further dry or flood a cell. The fan 80 may be pulsed on for about 10 seconds and then off for the same amount of time to reduce or delete the concentrations of the gases, particularly the large concentration of oxygen. Longer pulses may last up to about 2 minutes.

Alternatively, the fan 80 may rest between pulses for a predetermined length of time, such as about 10 minutes to about 60 minutes during charging. For example, the fan 80 may have one pulse of approximately 1 minute during every 30 minutes of charging to ensure that the oxygen concentrations in the central space 98 and the channels 99 remain low. Because an air flow through the tubes 87, 88 is created whenever the fan 80 is turned on, the high concentrations of generated gases are mixed and diluted with ambient air.

The fan 80 also may pulsate immediately after charging in a purging run to reduce the gas concentration within the central space 98 and the channels 99. The fan 80 may have at least one pulse immediately after charging from about 10 seconds to about 2 minutes in order to reduce the gas concentrations to acceptable levels. The fan 80 need only run long enough to reduce the oxygen concentration within the central space 98 and the channels 99 down to near atmospheric levels.

Because oxygen and hydrogen may continue to seep from the cells 76–79 even after charging is complete, the fan 80 also may pulsate at a pre-determined interval for some time after charging is complete. For example, after an initial purging run at the completion of charging, the fan may thereafter have at least one pulse for up to two minutes each at pre-determined intervals such as every 30 minutes for the next 2 hours. Again, the fan 80 need stay on only long enough to reduce the oxygen concentration within the central space 98 and the channels 99 down to near atmospheric levels.

FIGS. 6–12 show alternative embodiments using single air electrode cells in a metal-air battery pack 102 in accordance with the present invention. The battery pack 102 comprises a two part housing 104 which consists of a control section 104a and a cell stack section 104b. The housing 104 is preferably made of molded plastic.

As shown by FIG. 7, the cell stack section 104b of the housing encloses a plurality of battery cells 162, which are arranged in a plurality of cell stacks 160. While the number of cell stacks 160 and the number of battery cells 162 in each stack may vary depending on the size and shape of the battery pack 102 as well as the number of battery cells 162 needed to power the battery's load, the battery pack 102 of the preferred embodiment comprises three cell stacks 160 with four cells 162 each.

A front stack 160a, a center stack 160b and a rear stack 160c are positioned adjacent to each other. The cell stacks 160 are attached to one another by a bead of hot melt adhesive to prevent air flowing vertically between them. It will be understood by those skilled in the art that alternative materials such as caulk or sealant may be used to prevent vertical air flow between the cell stacks 160. Additionally, the parts of the cells at each level may by formed together to prevent said vertical air flow.

The cell stacks 160 are secured in the cell stack section 104b of the housing by a front wall 114, which extends across a portion of the exposed face of cell stack 160a. The cell stacks 160 are narrower than cell stack section 104b of the housing, leaving a space 164a and a space 164b running along the sides of the cell stacks 160.

Shown in detail in FIGS. 8 and 9, the control section 104a of the housing includes extended sides 106 which overlap indentations 108 of the cell stack section 104b. A pair of thumbscrews 110 are mounted in recesses 109 in the bottom of the control section 104a for securing the control section 104a to the cell stack section 104b. The thumbscrews 110 are supported by thumbscrew covers 111 from which the thumbscrews 110 extend rearward toward a pair of threaded retainers 112. Where they enter the housing 104, the thumbscrews 110 carry washer-like seals (not shown) to prevent air flow around the thumbscrews 110. When the thumbscrews 110 are secured in the threaded retainers 112, the housing sections form an essentially air tight seal.

The control section of the housing 104a includes a control panel 116 which holds a pair of power supply output jacks 118 and a recharge connector 120. The power supply output jacks and the recharge connector are connected to the battery cells 162 through a printed circuit board 122, a printed circuit board connector 124, wiring 126 and a control panel receptor 128.

A plurality of light emitting diodes 130 and a test actuator 134 are surface mounted on the printed circuit board 122. These components extend through appropriate openings formed in the control panel 116. The test actuator 134 may be actuated by depressing a test button 132 that extends from the actuator 134 through an opening in the control panel 116. The light emitting diodes 130 provide an indication of the charge level of the battery pack 102 when the test actuator 134 is actuated. Alarms as well as other status indicators may be provided on the printed circuit board 122. For example, a battery leakage alarm may be provided as disclosed in U.S. patent application Ser. No. 08/229,368. It will be understood by those skilled in the art that the printed circuit board 122 may include electronics which permit the recharging process to be controlled. However, such electronics are not part of the present invention, which provides air management benefits regardless of the particular nature of such electronics.

An air exchange opening 140 is provided in the control section housing 104a for admitting ambient air into the housing 104. The air exchange opening 140 is formed in an air inlet projection 152. Preferably, the air exchange opening 140 is an elongate rectangular slot having an area from about 0.05 square inch to about 0.15 square inch. The slot 140 preferably is 0.12 inch wide by 0.8 inch long, and preferably has an area of 0.096 square inch. In front of the air exchange opening 140, a decorative grill 144 is formed of spaced vertical posts which allow the ambient air to flow through the grill.

A switch actuator opening 146 is formed in the control panel 116 for receiving a front protrusion 148 of a switch actuator 138 which also serves as an air door. The actuator 138 slides in a track (not shown) defined in the rear surface of the face plate. An integrally formed air door projection 150 extends rearwardly from the air door 138 and forms a generally triangular cross section. On a surface of the projection 150 facing the air inlet projection 152, an air door gasket 154 is fixed. When the air door 138 slides toward the projection 152, the gasket 154 presses against the air exchange opening 140 and seals it. The actuator/air door 138 also defines a rearwardly extending protrusion 156 for actuating an electric switch 136 as described below.

The switch 136 is mounted on the printed circuit board 122 at the edge closest to the actuator 138, so that the switch 136 is mechanically activated by the protrusion 156 when the actuator 138 is slid toward the printed circuit board 122. This turns on an air moving device 142 via conventional circuitry (not shown) as the air exchange opening 140 is uncovered.

The air moving device 142 is preferably a fan and will be so referred to hereafter. Thus, the term "fan" used herein is intended to mean any device used to move air. The fan 142 circulates air within the housing 104 to provide reactant air for the battery cells 162. The rated capacity of the fan is preferably about 6.3 cu. ft. per minute at zero static pressure. The fan 142 may be positioned within the housing 104, as described below, or it may be mounted on the outside of the housing 104. In the latter case, the fan 142 would draw air from the housing 104 and then return it to the housing 104. The fan 142 may be mounted in any convenient manner.

Returning to FIG. 6, the fan 142 is disposed in an air plenum 158 formed between the air exchange opening 140 and the battery cells 162. Preferably, the fan 142 is positioned so that the flow of air from the fan 142 is parallel to the control panel 116, which is parallel to the front of the battery cells 162. The air exchange opening 140 is disposed on the high pressure side of the fan 142.

As air from the fan 142 flows past the air exchange opening 140, a portion of the air is diffused outside the housing through the air exchange opening 140. At the same time, a limited amount of ambient air is diffused into the housing through the air exchange opening 140 as described in commonly-owned U.S. Pat. No. 5,356,729, which is incorporated herein by reference.

Figure 10:
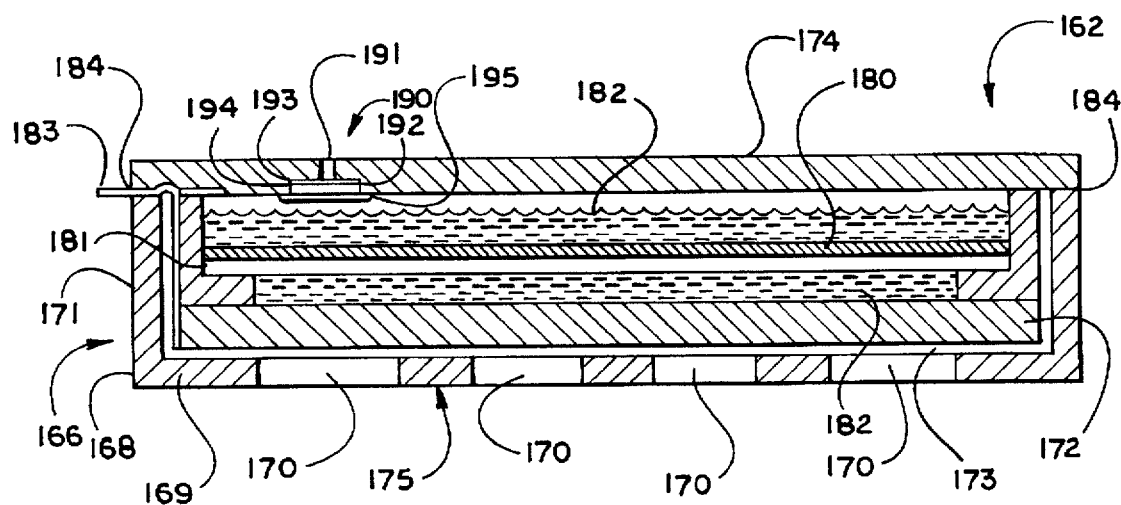
FIG. 10 is a cross sectional view of a cell of the metal-air battery of FIG. 6 showing the air cathode assembly, the anode and a hydrogen vent.

Depicted in FIG. 10 are the various components of the metal-air battery cell 162. A cell case 166 includes a case body 168 consisting of a cell bottom 169, a cell lid 174 and an upwardly extending peripheral side wall 171. An air cathode assembly 175 is disposed within the cell case body 168, along the bottom of the cell case body 168.

The air cathode assembly 175 comprises a plurality of openings 170 along the cell bottom 169 and an air cathode 172 exposed to the atmosphere via the openings 170. A gas-permeable, hydrophobic membrane 173 extends along the interior of the cell case 166 between the cathode 172 and the openings 170 and along the sidewall 171 to prevent electrolyte leakage and to reduce the amount of moisture exiting the cell 162, while allowing air to pass through for reaction at the cathode 172.

A cathode support 178 secures the cathode 172 in position in the cell case body 168 as well as containing and supporting an anode screen 180, an absorbent separator material 181 and an electrolyte 182. The cell lid 174 encloses the cell body 168 and meets the body 168 along a seam 184. An electrode lead 183 extends from the cathode 172 along the side wall 171 and through the seam 184, between the lid 174 and the cell side wall 171. The aqueous electrolyte 182 partially fills the cell case 166 thereby defining a liquid volume within the cell case 166. The remaining non-solid volume defines a gas volume within the cell case 166 depending upon the volume of the cell case 166 filled by the aqueous electrolyte 182.

Zinc is the preferred metal for the anode 180 because of its availability, energy density, safety, and relatively low cost. KOH is the preferred electrolyte 182. The preferred cathode is described in U.S. Pat. No. 5,306,579, which is incorporated herein by reference.

One or more vent systems 190 are provided in the cell lid 174 for exhausting excess gas generated by the cell 162 from within the cell case 166 to prevent excess pressure from building within the cell case 166. Each vent system 190 comprises a small gas exit hole 191, a recess 192 within the cell case section, a gas-permeable, hydrophobic membrane 193, a porous gas diffuser 194 and a gas-permeable, hydrophobic membrane 195. The gas exit hole 191 extends through the cell case to provide a means for exhausting gases generated during operation of the metal-air cell 162. Within the recess 192, the gas-permeable hydrophobic membrane 193 is attached to the surface of the recess 192 such that the membrane 193 covers the gas exit hole 191. The recess 192 is preferably circular in shape. The gas diffuser 194 has a plurality of pores and is placed adjacent to the membrane 193 within the recess 192 so as to cover the gas exit hole 191. The other membrane 195 may be attached to the interior surface of the cell case 166 so as to cover the recess 192 and the gas diffuser 194 which is fitted within the recess 192. The vent systems 190 are each constructed as disclosed by commonly-owned U.S. Pat. No. 5,362,577, which is incorporated herein by reference.

Figure 12:
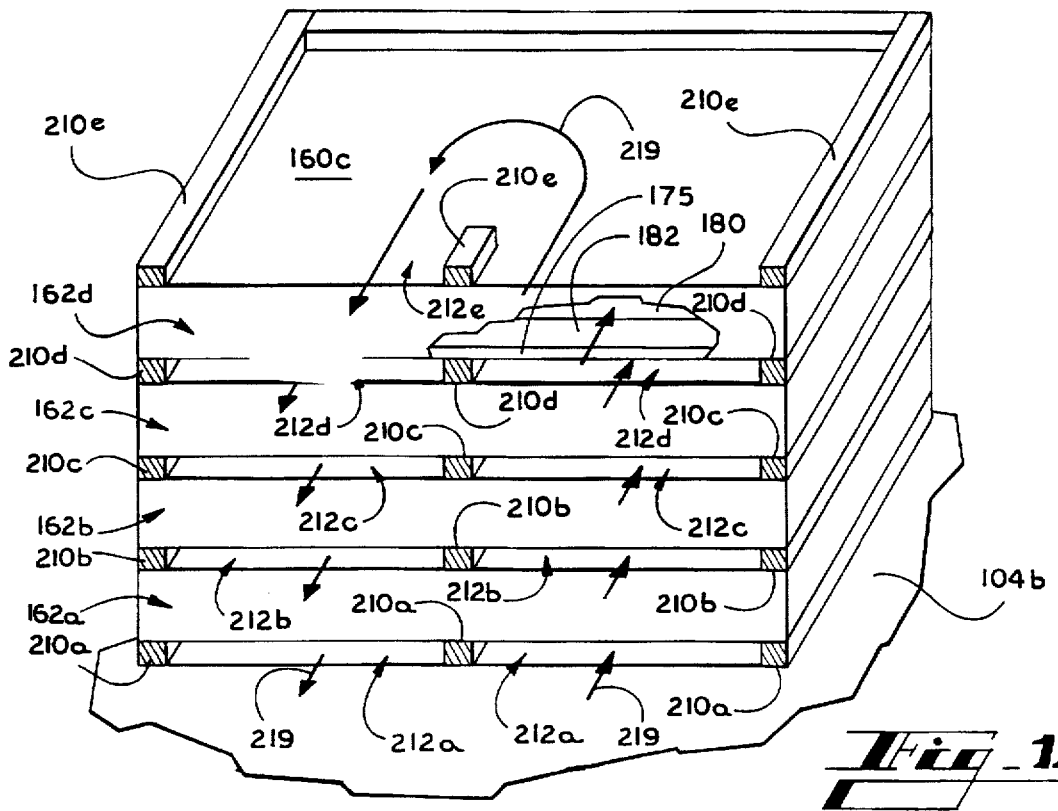
FIG. 12 is a perspective view of a cell stack of the metal-air battery of FIG. 6 in connection with the first channel embodiment of the present invention showing the positioning of the spacer barriers between the air cathode assemblies and the cell casings or the cell housing.

As shown by FIG. 12, the cells 162 are disposed with the cathode assemblies facing the bottom of the cell stack housing 104b. The cells 162 are positioned at spaced apart levels by sets of spacer barriers 210. The cell nearest the bottom of the housing 162a is separated from the housing by a set of spacer barriers 210a. The next cell 162b is, in turn, separated from the cell 162a by a set of spacer barriers 210b. The cell 162c is separated from the cell 162b by a set of spacer barriers 210c and the cell 162d is separated from the cell 162c by a set of spacer barriers 210d. A set of spacer barriers 210e separate the cell 162d from the top of the housing 104.

In one embodiment of the invention, the space 164a adjacent to the cell stacks 160b and 160c is sealed off from the flow of air by a foam barrier 167. Additionally, the space 164b is completely sealed off from the flow of air by a foam barrier 169. Thus, the entire flow of air is confined to the air pathway which extends across the entire area of all the air cathodes. Therefore, the entire area of all the air cathodes is supplied with reactant air. The part of the space 164a adjacent cell stack 160a forms an extension of the plenum 158.

The cell casing or the housing opposite each cell 162, as the case may be, forms a facing wall, which with the spacer barriers 210 forms a channel 212 between each cell level. Each cell stack 160 thus has five (5) similar channels 212a, 212b, 212c, 212d and 212e at spaced apart vertical levels. The four (4) channels 212a, 212b, 212c and 212d between the cells 162 provide reactant air to the cells 162. The channel 212e above the top cell 162d removes hydrogen gas vented from that cell. Also, in addition to providing reactant air to the cells above them, the channels 212b, 212c and 212d additionally remove hydrogen gas vented by the cells 162a, 162b and 162c, respectively.

The channels 212 each have an air inlet end 214 and an air outlet end 216 that are open to the air plenum 158.

Together the air plenum 158 and the channels 212 form an air pathway that is isolated from general circulation in the housing 104.

More specifically, in one embodiment of the present invention (FIGS. 11 and 12), each set of spacer barriers 210 which configures the channel at each level includes a first U-shaped spacer barrier 213 that extends from the front end of the housing 104b across the edges of the cell stacks 160a, 160b and 160c, along the back of the cell stack 160c and then along the opposite side of the cell stacks 160c and 160b. A second L-shaped spacer barrier 215 extends along the interior of the wall 114 from the space 164a to the mid-point of the cell stack 160a and then rearwardly down the middle of the cell stacks 160a, 160b and a portion of 160c.

An air deflector 220 is disposed in the air plenum 158. The deflector 220 extends from a front wall 221 of the plenum to a point which seals against the cell stack 160a when the housing sections 104a and 104b are assembled. The deflector 220 extends vertically to seal against the top and bottom of the interior of the control section 104b of the housing. The air deflector 220 deflects the flow of air from the fan to the air inlet ends 214 of the channels 212. In each channel, the air flows rearwardly from the inlet end 214 along one side of the cell stacks 160, across the back of the cell stack 160c and then forwardly along the other side of the cell stacks 160 to the end of the barrier 213. The air exits the channels into the space 164a and into the plenum 158 next to the fan 142. The flow is shown by the arrows 219.

Figure 13:
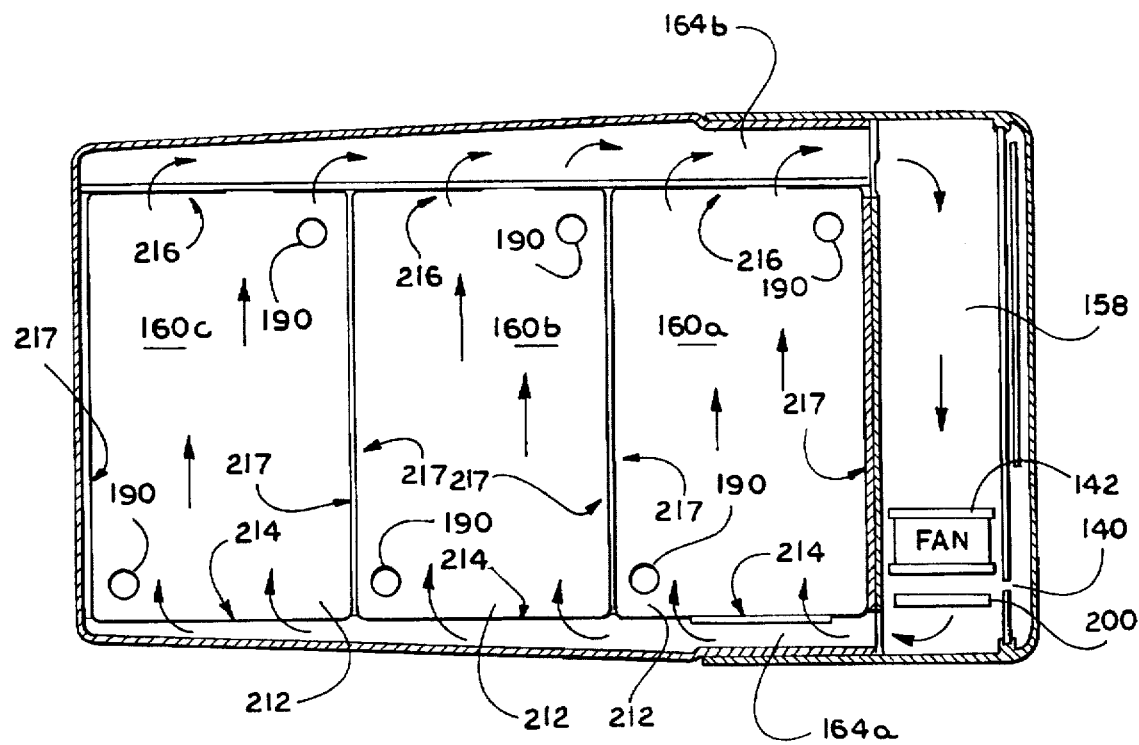
FIG. 13 is a diagrammatic view of the metal-air battery of FIG. 6 utilizing a second channel embodiment showing the positioning of the spacer barriers between the air cathode assemblies and the cell casings or the cell housing.
Figure 11:
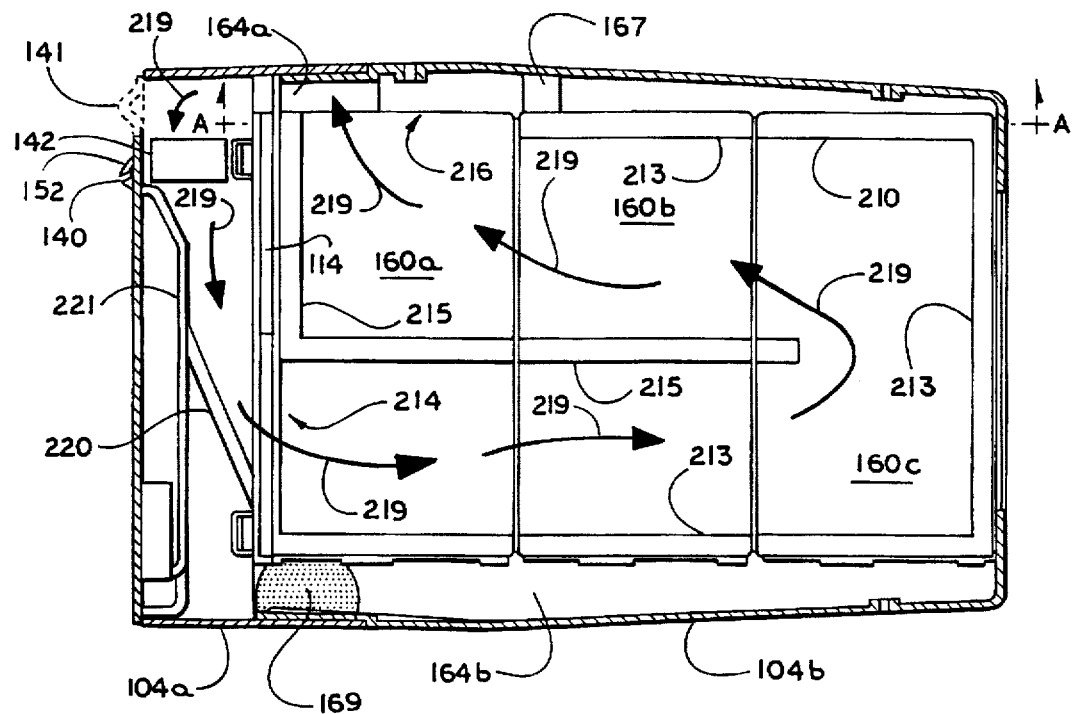
FIG. 11 is a diagrammatic top view of the interior of the metal-air battery of FIG. 6 showing the position of the spacer barriers in connection with the first channel embodiment of the present invention.

A further embodiment of the present invention is described in connection with the same cell configuration as shown in FIG. 11. In this embodiment, shown in FIG. 13, spacer barriers 217 are positioned transversely along the sides of the cell stacks 160 that are parallel to the air plenum 158. The spaces 164 are not sealed in this embodiment but form part of the air plenum.

The flow of air from the fan 142 flows into and along space 164a. In space 164a, a portion of the flow is diverted into the channels 212 of the cell stack 160a. The remaining air flows farther along the space 164a where a further portion is diverted into the channels 212 of the cell stack 160b. The remaining portion of the air flows farther along the space 164a and then through the channels of the cell stack 160c. The air exits the channels 212 of all of the cell stacks 160 into the space 164b where it is drawn back into the air plenum 158. Thus, the entire flow of air is again confined to the air pathway which extends across the entire area of all the air cathodes and supplies that entire area with reactant air.

In either channel configuration, during operation of the cells 162 reactant air is recirculated by the fan 142 from the air plenum 158 through the channels 212 and back to the air plenum 158. The reactant air enters the air inlet ends of the channels 214 and flows through to the air outlet ends 216. As the reactant air flows through the channels 212, it is depleted of oxygen by the operation of the cells 162. To compensate for the oxygen used, a select amount of the depleted air is exchanged for ambient air through the air exchange opening 140. Only a limited amount of the depleted air is exchanged for ambient air.

As an alternative means to exchanging air by diffusion through the single air exchange opening 140, a second air exchange opening 141 may be provided as shown in FIG. 11 by the dashed lines. The second air exchange opening 141 is disposed on the low pressure side of the fan 142 such that ambient air is drawn into the housing 104 through the second air exchange opening 141 and a portion of the recirculated air is discharged from the housing 104 through the air exchange opening 140.

During the recharging of the metal-air battery pack 102, hydrogen and oxygen gases are generated by the metal-air cells 162. In the single electrode embodiments, the hydrogen gas is released through the vent systems 190 at the cell lids 174 while the oxygen gas is released through the cathode assemblies at the cell bottoms 169. The generated hydrogen gas enters the channel 212 directly adjacent to the vent system 190 of each cell and the oxygen gas enters the channel 212 directly adjacent to the cathode assembly of each cell. Thus, the two gases may be in close proximity. Due to the explosive properties of hydrogen gas in the presence of oxygen gas, such as could exist during or after charging, the fan 142 is operated to remove the generated gases from the channels 212.

In one embodiment, the fan 142 is pulsed on and then off for the same amount of time to create a pulsating air flow through the channels 212 during charging. By pulsing the fan 142, a sufficient air flow is created to remove the gases from the cells 162 and the channels 212. Continually running the fan 142, however, can further dry or flood a cell. The fan 142 may be pulsed on for about 10 seconds and then off for the same amount of time to reduce or delete the concentrations of the gases, particularly the large concentration of oxygen. Longer pulses may last up to about 2 minutes.

Alternatively, the fan 142 may rest between pulses for a predetermined length of time, such as about 10 minutes to about 60 minutes during charging. For example, the fan 142 may have one pulse of approximately 1 minute during every 30 minutes of charging to ensure that the oxygen concentrations in the channels 212 remain low.

The fan 142 also may pulsate immediately after charging in a purging run to reduce the gas concentration within the channels 212. The fan 142 may have at least one pulse immediately after charging from about 10 seconds to about 2 minutes in order to reduce the gas concentrations to acceptable levels. The fan 142 need only run long enough to reduce the oxygen concentration within the channels 212 down to near atmospheric levels.

Because oxygen and hydrogen may continue to seep from the cells 162 even after charging is complete, the fan 142 also may pulsate at a pre-determined interval for some time after charging is complete. For example, after an initial purging run at the completion of charging, the fan may thereafter have at least one pulse for up to two minutes each at pre-determined intervals such as every 30 minutes for the next 2 hours. Again, the fan 142 need stay on only long enough to reduce the oxygen concentration within the channel 212 down to near atmospheric levels.

The air door 138 preferably is left in the open position during and immediately after recharging to permit mixing and dilution of the generated gases flushed from the channels 212 by the fan 142. Alternatively, the air door 138 may remain closed during all or part of recharging and thereafter such that the pulsating air flow created by fan 142 reduces pockets of high concentrations of the generated gases within the channels 212. Similarly, the air door 138 is generally closed during the periodic fan pulses after recharge is complete. Leaving the air door 138 open after charging is complete may tend to dry out the cell. Finally, those skilled in the art will appreciate that a further alternative is to open the air door 138 only when the fan 142 is running.

From the foregoing description of the preferred embodiments and the several alternatives, other alternative constructions of the present invention may suggest themselves to those skilled in the art. Therefore, the scope of the present invention is to be limited only by the claims below and equivalents thereof.

We claim:

1. A rechargeable metal-air battery comprising:

a housing;

at least one metal-air cell within said housing, said metal-air cell generating oxygen and hydrogen during cell charging;

an air flow path within said housing; and an air movement device communicating with said housing;

said air movement device creating a pulsating air flow within said air flow path.

2. The rechargeable metal-air battery of claim 1, wherein said air movement device comprises a fan.

3. The rechargeable metal-air battery of claim 1, wherein said air movement device pulsates during cell charging.

4. The rechargeable metal-air battery of claim 1, wherein said air movement device pulsates on for a predetermined length of time and then off for the same length of time.

5. The rechargeable metal-air battery of claim 4, wherein said predetermined length of time said air movement device pulsates on and off is from about 10 seconds to about 2 minutes each.

6. The rechargeable metal-air battery of claim 1, wherein said air movement device pulsates immediately after cell charging is complete.

7. The rechargeable metal-air battery of claim 6, wherein said air movement device has at least one pulse of about 30 seconds to about 2 minutes after said cell charging is complete.

8. The rechargeable metal-air battery of claim 1, wherein said air movement device pulsates periodically after cell charging is complete.

9. The rechargeable metal-air battery of claim 1, wherein said air movement device has at least one pulse at a predetermined interval.

10. The rechargeable metal-air battery of claim 9, wherein said predetermined interval is from about every 10 minutes to about every hour.

11. The rechargeable metal-air battery of claim 1, wherein said air movement device pulsates until the concentration of said generated oxygen gas within said air flow path is reduced to near atmospheric levels.

12. The rechargeable metal-air battery of claim 1, wherein said hydrogen and said oxygen in said air flow path is recirculated.

13. The rechargeable metal-air battery of claim 1, wherein said battery comprises a dual air electrode cell.

14. The rechargeable metal-air battery of claim 1, wherein said housing comprises one or more ventilation passageways.

15. The rechargeable metal-air battery of claim 14, wherein said ventilation passageways each comprise a cross sectional area and length selected to eliminate substantially air flow into said housing when said air movement device is turned off.

16. A rechargeable metal-air battery comprising:

a housing;

at least one metal-air cell within said housing;

an air flow path within said housing; and an air movement device communicating with said housing;

said battery having the phases of discharging, recharging, and charged;

said metal-air cell generating oxygen and hydrogen during said phase of recharging;

said air movement device generating within said air flow path a flow of the generated gases during said phase of recharging and during said charged phase.

17. The rechargeable metal-air battery of claim 16, wherein said air movement device comprises a fan.

18. The rechargeable metal-air battery of claim 16, wherein said air movement device pulsates to create a pulsating air flow.

19. The rechargeable metal-air battery of claim 16, wherein said air movement device has at least one pulse of about 30 seconds to about 2 minutes after said phase of charging is complete.

20. The rechargeable metal-air battery of claim 16, wherein said air movement device pulsates until the concentration of generated oxygen gas within said housing is reduced to near atmospheric levels.

21. The rechargeable metal-air battery of claim 16, wherein said air movement device has at least one pulse periodically during said charged phase at a predetermined interval.

22. The rechargeable metal-air battery of claim 21, wherein said predetermined interval is from about every 10 minutes to about every hour.

23. The rechargeable metal-air battery of claim 16, wherein said hydrogen and said oxygen in said air flow path is recirculated.

24. The rechargeable metal-air battery of claim 16, wherein said battery comprises a dual air electrode cell.

25. The rechargeable metal-air battery of claim 16, wherein said housing comprises one or more ventilation passageways.

26. The rechargeable metal-air battery of claim 25, wherein said ventilation passageways each comprise a cross sectional area and length selected to eliminate substantially air flow into said housing when said air movement device is turned off.

27. A rechargeable metal-air battery comprising:

a housing;

at least one metal-air cell within said housing, said metal-air cell generating oxygen and hydrogen during cell charging;

an air flow path within said housing; and an air movement device for directing a flow of the generated gases through said air flow path during cell charging;

said air movement device creating a pulsating air flow with at least one pulse of a predetermined length at a predetermined interval.

28. The rechargeable metal-air battery of claim 27, wherein said air movement device comprises a fan.

29. The rechargeable metal-air battery of claim 27, wherein said predetermined length of time said air movement device pulsates is from about 10 seconds to about 2 minute.

30. The rechargeable metal-air battery of claim 27, wherein said predetermined interval at which said air movement device pulsates is from about every 10 minutes to about every 60 minutes.

31. The rechargeable metal-air battery of claim 27, wherein said air movement device continues to provide said pulsating air flow after completion of cell charging at said predetermined interval.

32. The rechargeable metal-air battery of claim 27, wherein said hydrogen and said oxygen in said air flow path is recirculated.

33. The rechargeable metal-air battery of claim 27, wherein said battery comprises a dual air electrode cell.

34. The rechargeable metal-air battery of claim 27, wherein said housing comprises one or more ventilation passageways.

35. The rechargeable metal-air battery of claim 34, wherein said ventilation passageways each comprise a cross sectional area and length selected to eliminate substantially air flow into said housing when said air movement device is turned off.

36. A method for reducing gas concentrations in a metal-air battery comprising a plurality of metal-air cells within a housing, an air flow path within said housing, and a fan communicating with said housing, comprising the steps of:

generating oxygen and hydrogen during cell recharging into said air flow path;

pulsating said fan to create a pulsating air flow through said air flow path whereby the concentration of said gases within said air flow path is reduced.

37. The method of claim 30, wherein said step of pulsating takes place during cell charging.

38. The method of claim 30, wherein said step of pulsating takes place immediately after cell charging is complete.

39. The method of claim 30, wherein said step of pulsating takes place periodically after cell charging is complete.

* * * * *